(12) United States Patent
Kuriyama et al.

(10) Patent No.: US 9,561,984 B2
(45) Date of Patent: Feb. 7, 2017

(54) CATION CONCENTRATION INCREASING AGENT, MODIFYING AGENT FOR CONCRETE STRUCTURE, METHOD FOR MANUFACTURING SAME, AND METHOD FOR REPAIRING CONCRETE STRUCTURE

(71) Applicant: AES Co., Ltd., Yamagata-shi, Yamagata (JP)

(72) Inventors: Yasumoto Kuriyama, Yamagata (JP); Masaaki Seya, Yamagata (JP); Yoshihisa Suzuki, Yamagata (JP); Masatoshi Abiko, Yamagata (JP)

(73) Assignee: AES CO., LTD., Yamagata-Shi, Yamagata (JP)

( * ) Notice: Subject to any disclaimer, the term of this patent is extended or adjusted under 35 U.S.C. 154(b) by 0 days.

(21) Appl. No.: 14/762,632

(22) PCT Filed: Mar. 27, 2014

(86) PCT No.: PCT/JP2014/058933
§ 371 (c)(1),
(2) Date: Jul. 22, 2015

(87) PCT Pub. No.: WO2014/157545
PCT Pub. Date: Oct. 2, 2014

(65) Prior Publication Data
US 2015/0353425 A1 Dec. 10, 2015

(30) Foreign Application Priority Data

Mar. 29, 2013 (JP) ................................. 2013-071983
Aug. 28, 2013 (JP) ................................. 2013-176699

(51) Int. Cl.
*C04B 24/04* (2006.01)
*B05D 7/24* (2006.01)
(Continued)

(52) U.S. Cl.
CPC ............. *C04B 24/04* (2013.01); *B05D 3/007* (2013.01); *B05D 5/005* (2013.01); *B05D 7/24* (2013.01);
(Continued)

(58) Field of Classification Search
CPC .......... C04B 24/04; C04B 24/40; C04B 3/007; C25B 1/00; B05D 5/005; B05D 7/24; B05D 2203/30; B05D 2401/20
(Continued)

(56) References Cited

FOREIGN PATENT DOCUMENTS

JP 56-37256 A 4/1981
JP 62-265189 A 11/1987
(Continued)

OTHER PUBLICATIONS

Form PCT/ISA/210 issued in PCT/JP2014/058933 with English translation dated Jun. 24, 2014 (3 pages).
(Continued)

*Primary Examiner* — William Phillip Fletcher, III
(74) *Attorney, Agent, or Firm* — Flynn, Thiel, Boutell & Tanis, P.C.

(57) ABSTRACT

A modifying agent of an alkaline electrolyzed water. A substance being supplied to a concrete structure in order to produce calcium silicate for repairing concrete and including an alkali metal silicate is defined as a concrete protective agent. The modifying agent is supplied to the concrete structure in advance of the supply of the concrete protective agent. The alkali metal silicate and the calcium ion included in the concrete protective agent contribute to the production of the calcium silicate. A method for repairing a concrete structure includes supplying the concrete protective agent to the concrete structure and supplying a modifying agent for a concrete structure including an alkaline electrolyzed water to the concrete structure, the step supplying a modifying
(Continued)

agent being performed before the step of supplying the concrete protective agent to promote production of the calcium silicate in step of supplying the concrete protective agent.

6 Claims, 6 Drawing Sheets

(51) Int. Cl.
*B05D 5/00* (2006.01)
*C04B 41/52* (2006.01)
*C04B 41/70* (2006.01)
*C04B 24/40* (2006.01)
*B05D 3/00* (2006.01)
*C25B 1/00* (2006.01)
*C04B 41/00* (2006.01)
*C04B 111/72* (2006.01)

(52) U.S. Cl.
CPC .............. *C04B 24/40* (2013.01); *C04B 41/009* (2013.01); *C04B 41/52* (2013.01); *C04B 41/70* (2013.01); *C25B 1/00* (2013.01); *B05D 2203/30* (2013.01); *B05D 2401/20* (2013.01); *C04B 2111/72* (2013.01)

(58) Field of Classification Search
USPC ...... 427/140, 301, 343, 344, 397.8; 106/600
See application file for complete search history.

(56) References Cited

FOREIGN PATENT DOCUMENTS

| | | | |
|---|---|---|---|
| JP | 8-67579 A | | 3/1996 |
| JP | H08-67579 A | * | 3/1996 |
| JP | 2007-126309 A | | 5/2007 |

OTHER PUBLICATIONS

Form PCT/ISA/237 issued in PCT/JP2014/058933 dated Jun. 24, 2014 (3 pages).
Form PCT/ISA/220 issued in PCT/JP2014/058933 dated Jun. 24, 2014 (2 pages).

* cited by examiner

CATION CONCENTRATION INCREASING AGENT, MODIFYING AGENT FOR CONCRETE STRUCTURE, METHOD FOR MANUFACTURING SAME, AND METHOD FOR REPAIRING CONCRETE STRUCTURE

TECHNICAL FIELD

The present invention relates to a cation concentration increasing agent, a modifying agent for a concrete structure, a method for manufacturing the same, and a method for repairing a concrete structure.

BACKGROUND ART

Concrete is high in resistance to various environments, and moreover, strongly alkaline, and hence is used for concrete structures. Due to the strong alkalinity of concrete, a passive film is formed on the surface of reinforcing bars placed inside a concrete structure, and hence the reinforcing bars are protected from the corrosion due to, for example, water or chlorine from the outside. Consequently, concrete structures are known as structures high in durability.

However, concrete structures having been considered to have high durability are degraded in durability due to, for example, neutralization, salt damage, frost damage or alkali-aggregate reaction, and doubt comes to be cast on the service life of concrete structures as structures.

Accordingly, methods for repairing such a degraded concrete structure have been proposed. For example, Japanese Patent Laid-Open No. 62-265189 (Patent Literature 1) proposes a method in which aqueous solutions of nitrites are used as anticorrosives for reinforcing bars, penetrating deep into inside concrete.

Japanese Patent Laid-Open No. 2007-126309 (Patent Literature 2) states that in order to produce a gelled substance contributing to repairing a concrete structure, calcium ions in the concrete and an alkali silicate penetrant are necessary, and in order to promote the production of the gelled substance, it is necessary to set the pH of the concrete at 11 or less. On the basis of such an observation, Patent Literature 2 proposes a method in which a calcium salt aqueous solution (for example, a calcium chloride aqueous solution) and an alkali silicate penetrant (for example, sodiumsilicate) are separately allowed to penetrate into concrete, and thus a gelled substance is produced.

SUMMARY OF INVENTION

Technical Problem

However, the method described in Patent Literature 1 uses aqueous solutions of nitrites having high carcinogenicity, and hence when this method is applied, a protection measure to protect the intake into the body of such nitrites and sufficient ventilation are required.

On the other hand, the method described in Patent Literature 2 uses a calcium chloride aqueous solution as a source of supply of calcium ions, and hence chlorine to be a causative substance of salt damage is present, as a by-product of the production of the gelled substance. In other words, the method described in Patent Literature 2 enables a temporary, namely, short-period repair, but is not suitable for a long-period repair.

Moreover, it is necessary to use as the calcium chloride aqueous solution a solution having a concentration as low as not to cause salt damage; in this case, no sufficient amount of the gelled substance is produced, or the production of the gelled substance takes a long time.

In view of such circumstances as described above, the present invention intends to provide a modifying agent for a concrete structure that allows the modification operation of a concrete structure to be safe for the human body and simple, and is capable of imparting high durability to the concrete structure, and a method for manufacturing the modifying agent. The present invention also intends to provide a method for repairing a concrete structure by using the modifying agent for a concrete structure. Additionally, the present invention also intends to provide a cation concentration increasing agent capable of being an effective component of the modifying agent for a concrete structure.

Solution to Problem

On the basis of the diligent study performed by the present inventor, the above-described objects are achieved by the following means.

The modifying agent for a concrete structure of the present invention includes an alkaline electrolyzed water.

The modifying agent preferably includes calcium ions. The alkaline electrolyzed water preferably has a pH of 11 or more. The calcium ion concentration is preferably 10 mg/L or more.

The modifying agent for a concrete structure of the present invention is characterized in that when a substance being supplied to a concrete structure in order to produce the calcium silicate for repairing concrete and including an alkali metal silicate is defined as a concrete protective agent, the modifying agent is supplied to the concrete structure in advance of the supply of the concrete protective agent; and the alkali metal silicate and the calcium ions included in the concrete protective agent contribute to the production of the calcium silicate.

The modifying agent for a concrete structure is preferably supplied to a concrete structure in order to repair cracks of the concrete structure.

The method for repairing a concrete structure of the present invention includes, when a substance being supplied to a concrete structure in order to produce the calcium silicate for repairing the concrete structure and including an alkali metal silicate is defined as a concrete protective agent: a protective agent supply step of supplying the concrete protective agent to the concrete structure; and a modifying agent supply step of supplying the modifying agent for a concrete structure according to any one of claims 1 to 6 to the concrete structure, the modifying agent supply step being performed before the protective agent supply step in order to promote the production of the calcium silicate in the protective agent supply step.

In the protective agent supply step, the concrete protective agent is preferably supplied to the concrete structure in a state of being penetrated by the alkaline electrolyzed water. The method for repairing a concrete structure preferably includes a drying step of drying the calcium silicate performed after the protective agent supply step. The method for repairing a concrete structure preferably further includes a wetting step of supplying water to the calcium silicate in a dry state.

Additionally, the present invention is the method for manufacturing a modifying agent for a concrete structure including an alkaline electrolyzed water including calcium ions dissolved therein, wherein the method includes an electrolysis step of performing electrolysis for water including a water-soluble calcium-containing compound, and at least one of a chloride ion and a hydrogencarbonate ion.

Yet additionally, the present invention is a cation concentration increasing agent for increasing the concentration of a cationic ion in a solution, wherein the agent includes an alkaline electrolyzed water. The solution is preferably a modifying agent for a concrete structure.

Advantageous Effects of Invention

According to the present invention, the modification operation of a concrete structure is safe for the human body and simple, and the present invention is capable of imparting high durability to a concrete structure.

DESCRIPTION OF EMBODIMENTS

Figure 1:
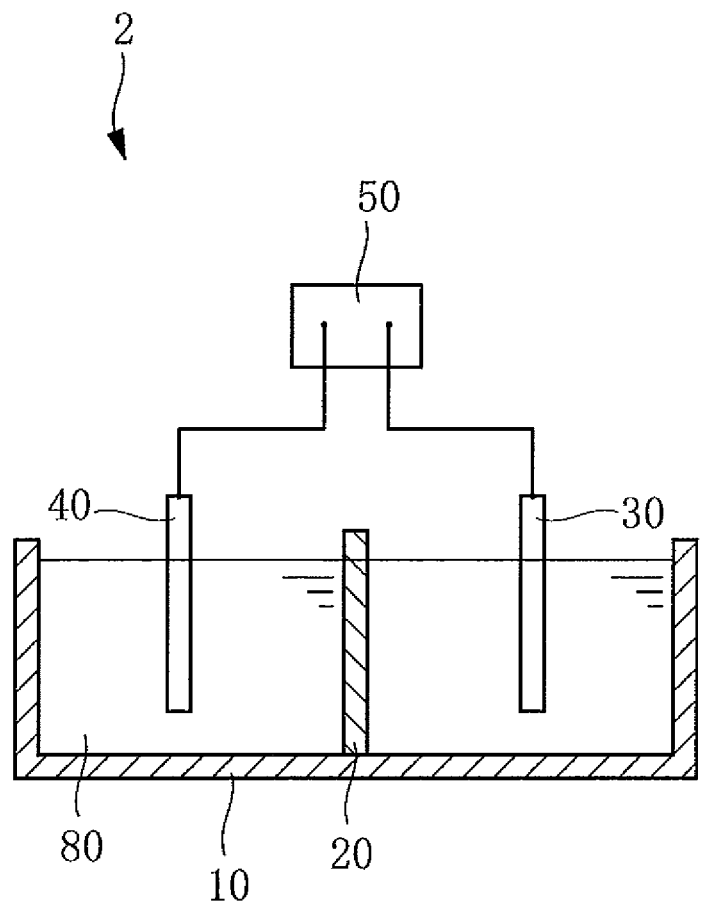
FIG. 1 is an illustrative diagram for illustrating the outline of manufacturing equipment for a modifying agent for a concrete structure.

Hereinafter, the embodiments of the present invention are described with reference to the accompanying drawings.

First, a modifying agent for a concrete structure is described.

The modifying agent for a concrete structure is an alkaline electrolyzed water including calcium ions dissolved therein. A prescribed solute may also be added to the alkaline electrolyzed water, if necessary.

The pH of the alkaline electrolyzed water is preferably 11 or more. The upper limit of the pH of the alkaline electrolyzed water may be, without particularly limited to, a degree of pH not to cause alkali-aggregate reaction in the case where the alkaline electrolyzed water is supplied to a concrete structure, namely, may fall within a range of the described total amount of the concrete alkali (3.0 kg/m$^3$ or less in terms of Na$_2$O). The solubility of calcium ions per 100 g of the alkaline electrolyzed water at 25° C. is, for example, 5.0 g, and is higher than the solubility (0.17 g) of calcium ions in the case where calcium hydroxide is dissolved in 100 g of water (25° C., pH 7). In other words, the alkaline electrolyzed water acts as a calcium ion concentration increasing agent in the modifying agent. For example, the calcium ion concentration in the alkaline electrolyzed water is preferably 10 mg/L or more. The alkaline electrolyzed water also acts as a concentration increasing agent for the cation (for example, an alkali metal ion such as a lithium ion, a sodium ion or a potassium ion) in a prescribed solution as well as the concentration increasing agent for the calcium ions in the modifying agent. Examples of the solution include, in addition to the modifying agent for a concrete structure, a concrete protective agent (to be described later).

As described later, when the calcium ion concentration in the alkaline electrolyzed water is a low concentration (for example, 10 mg/L or more and less than 1×10$^2$ mg/L), the reaction time with the concrete protective agent is relatively long, and hence the alkaline electrolyzed water can be allowed to penetrate into deep portions of cracks. Consequently, the concrete structure can be repaired from the surface layer portion to the deep portions of the cracks of the concrete structure. On the other hand, when the calcium ion concentration in the alkaline electrolyzed water is a high concentration (for example, 1×10$^2$ mg/L or more), the reaction time with the concrete protective agent is relatively short, and hence the repair of the surface layer portions of the cracks can be performed. Needless to say, depending on the state of the cracks, an alkaline electrolyzed water having a low calcium ion concentration and an alkaline electrolyzed water having a high calcium ion concentration may be used in combination. For example, after the deep portions of the cracks are repaired with a low-concentration alkaline electrolyzed water, the surface layer portions of the cracks may be repaired with a high-concentration alkaline electrolyzed water.

Next, the method for preparing the modifying agent for a concrete structure is described.

As shown in FIG. 1, the manufacturing equipment 2 for the modifying agent for a concrete structure is provided with a water tank 10, an ion-exchange membrane 20, an anode 30, a cathode 40, and an electric power supply 50 applying a predetermined voltage across the anode 30 and the cathode 40.

In the water tank 10, tap water including a calcium preparation dissolved therein is stored. Examples of the calcium preparation include: water-soluble calcium-containing compounds (calcium salts such as calcium lactate, calcium gluconate, and phosphoryl oligosaccharides of calcium).

The internal space of the water tank 10 is partitioned with an ion-exchange membrane 20, and the anode 30 and the cathode 40 are installed respectively in the two spaces partitioned with the ion-exchange membrane 20. Subsequently, by using an electric power supply 50, a predetermined voltage is applied across the anode 30 and the cathode 40 to perform electrolysis. By the electrolysis, hydrogen is generated on the side of the cathode 40, and at the same time, the alkaline electrolyzed water 80 including calcium ions dissolved therein is produced. On the other hand, on the side of the anode 30, acidic water including lactic acid, a chloride ion, a hydrogencarbonate ion and the like are produced as isolated from the alkaline electrolyzed water.

The calcium ion-containing alkaline electrolyzed water thus obtained can be used as the modifying agent for a concrete structure. Such an alkaline electrolyzed water does not contain substances harmful for human body and environmental pollutants, hence the operations are safe for human body and simple, and the alkaline electrolyzed water can be used without performing any specific preparation.

Figure 2:
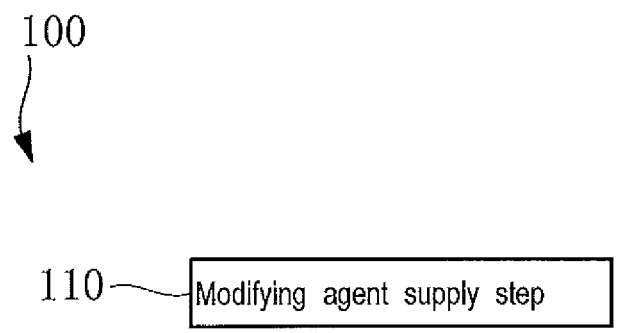
FIG. 2 is an illustrative diagram for illustrating the outline of a first method for repairing a concrete structure.

Next, with reference to FIG. 2, the method 100 for repairing a concrete structure using the modifying agent for a concrete structure is described.

In the method 100 for repairing a concrete structure, a modifying agent supply step 110 is performed. In the modifying agent supply step 110, the alkaline electrolyzed water including calcium ions dissolved therein is applied as the modifying agent for a concrete structure to the concrete structure. In the modifying agent supply step 110, any other method may also be adopted in which alkaline electrolyzed water including calcium ions dissolved therein is brought into contact with the concrete structure, and examples of such a method include a method in which the alkaline electrolyzed water including calcium ions dissolved therein is sprayed with a spray as the modifying agent for a concrete structure.

In the concrete to which the modifying agent for a concrete structure is applied by the modifying agent supply step 110, a large amount of hydroxide ions and a large amount of calcium ions are present.

Here, when the ratio ($=X_{Cl}/X_{OH}$) of the chloride ion concentration $X_{Cl}$ to the hydroxide ion concentration $X_{OH}$ exceeds a predetermined value, the corrosion of the reinforcing bars is known to start. By the above-described application of the modifying agent for a concrete structure, a large amount of hydroxide ions is supplied to the concrete structure, and consequently, a large amount of hydroxide ions is present in the concrete structure. When chloride ions penetrate into the concrete structure in which a large amount of hydroxide ions is present, namely, the concrete structure in which the alkalinity strength is increased, the ratio of the concentration of chloride ions to the concentration of hydroxide ions is suppressed to be low. Accordingly, in the concrete structure in which the alkalinity strength is increased, even when chloride ions penetrate into the concrete structure, the concentration of chloride ions hardly exceeds the limiting value at which the corrosion of reinforcing bars starts, and consequently, the corrosion of the reinforcing bars can be suppressed.

Owing to the supply of a large amount of calcium ions, a part of the supplied calcium ions is stably present as an insoluble crystal inside the concrete structure. Such an insoluble crystal does not contract by drying, and hence the cracks caused by the contraction do not occur in the concrete structure. Accordingly, in the concrete structure in which such an insoluble crystal is present, the penetration path for the degrading substance such as carbon dioxide gas, seawater or rainwater is hardly formed.

In this way, by supplying the alkaline electrolyzed water including calcium ions dissolved therein as the modifying agent for a concrete structure to a concrete structure, the durability of the concrete structure can be improved.

The modifying agent for a concrete structure can also be used as a promoter of the reaction of the concrete protective agent by using the modifying agent in combination with the concrete protective agent.

Figure 3:
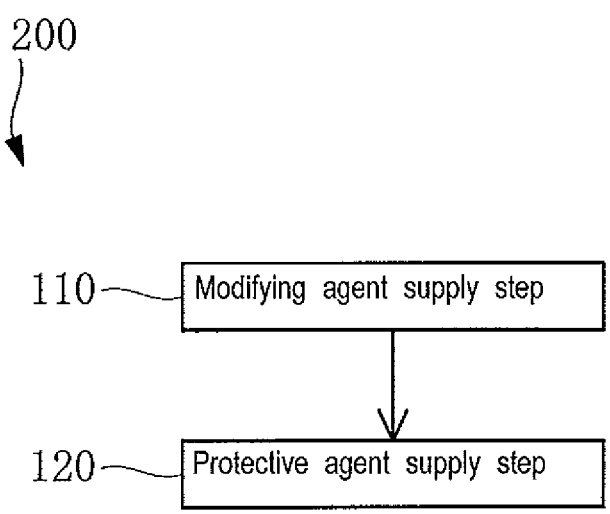
FIG. 3 is an illustrative diagram for illustrating the outline of a second method for repairing a concrete structure.

Next, with reference to FIG. 3, the method 200 for repairing concrete using the modifying agent for a concrete structure is described.

In the method 200 for repairing a concrete structure, the above-described modifying agent supply step 110 and the above-described protective agent supply step 120 for supplying the concrete protective agent to the concrete structure are performed.

In the protective agent supply step 120, any other method may also be adopted in which the concrete protective agent is brought into contact with the concrete structure, and examples of such a method include a method in which the concrete protective agent is sprayed with a spray.

The concrete protective agent includes silicates of alkali metals (for example, sodium, potassium and lithium). Additionally, the concrete protective agent is preferably substances free from calcium ions. Yet additionally, the concrete protective agent includes colloidal silicate, if necessary. Examples of the concrete protective agent include Super Shield (registered trademark) (manufactured by Super Shield Corp.).

In the method 200 for repairing a concrete structure, in concrete, calcium hydroxide, alkali metal silicate and water are allowed to react with each other to produce gel-like calcium silicate. The produced calcium silicate makes dense the surface layer portion of the concrete structure, can protect the penetration of the degrading substance from the outside, and hence can improve the durability of the concrete structure.

For example, in a concrete structure in a degraded state (for example, a concrete structure of less than pH 11, or a concrete structure of an elapsed time of about 10 years or more from being newly constructed), the calcium ions included at the time of being newly constructed are lost by, for example, the penetration of the degrading substance(s) from the outside. As a result of the application of the concrete protective agent to the concrete structure as it is in such a state (degraded state) that calcium ions are lost, because no sufficient amount of calcium ions is present, calcium silicate is not produced, or the production of calcium silicate takes a long time.

Accordingly, the modifying agent supply step 110 is performed for the concrete structure in a degraded state, in advance of the protective agent supply step 120. In this way, calcium ions can be replenished to the concrete structure. The application of the concrete protective agent to the concrete structure replenished with calcium ions allows the replenished calcium ions to contribute to the production of calcium silicate. Consequently, the application of the modifying agent for a concrete structure facilitates the production of calcium silicate in the concrete structure.

Additionally, the promotion of the production of calcium silicate requires a large amount of calcium ions. The modifying agent for a concrete structure is higher in the calcium ion concentration than usual calcium hydroxide aqueous solutions, and hence starts the reaction with the concrete protective agent in a short time.

For example, when a silicate-based concrete protective agent is applied to newly constructed concrete, it takes approximately 90 hours until the occurrence of the reaction (the production reaction of gel-like calcium silicate) of the silicate-based concrete protective agent. As described above, as a result of the application of only the concrete protective agent to the concrete in a degraded state as it is, calcium silicate is not produced, or the production of calcium silicate takes a long time.

On the other hand, when the alkaline electrolyzed water including calcium ions dissolved therein is applied to the newly constructed concrete, in advance of the application of the silicate-based concrete protective agent, it takes only 10 seconds to 30 seconds until the occurrence of the reaction of the silicate-based concrete protective agent. The reaction time of the silicate-based concrete protective agent can be regulated by the calcium ion concentration in the modifying agent for a concrete structure or the amount of the modifying agent for a concrete structure applied.

Accordingly, by performing the method 200 for repairing a concrete structure performing the modifying agent supply step 110 in advance of the protective agent supply step 120, the time required for the repair of the concrete structure can be reduced. The gel-like calcium silicate (wet gel), produced by the application of the modifying agent for a concrete structure and the application of the concrete protective agent, can block the entrance and exit of liquid and gas.

Figure 4:
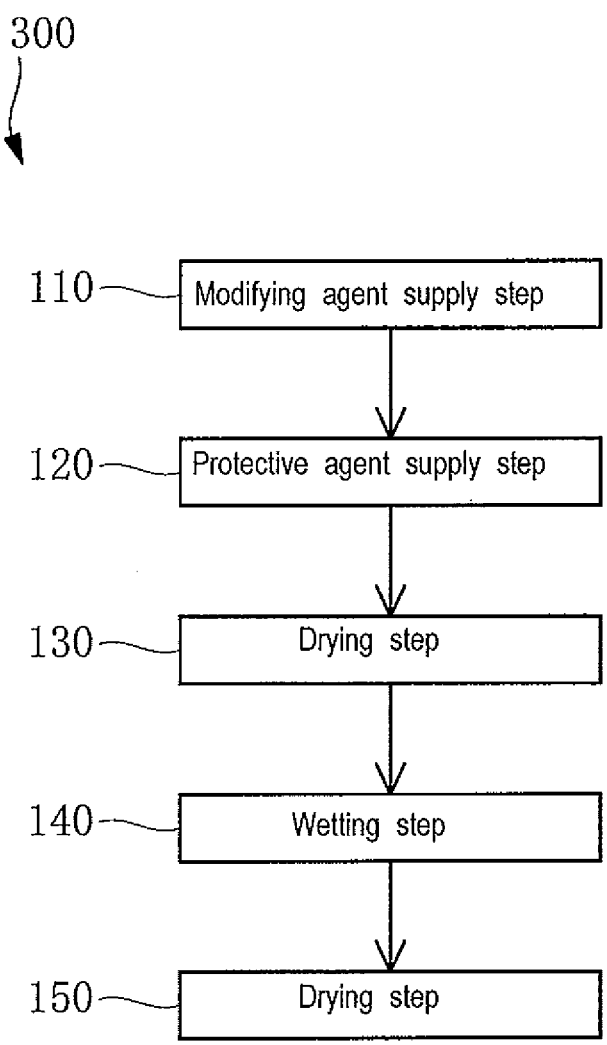
FIG. 4 is an illustrative diagram for illustrating the outline of a third method for repairing a concrete structure.

As shown in FIG. 4, as the method 300 for repairing a concrete structure, the drying step 130 may also be performed after the above-described modifying agent supply step 110 and the protective agent supply step 120. Additionally, a wetting step 140 may also be performed after the drying step 130. Yet additionally, a drying step 150 may also be performed after the wetting step 140.

In the drying step 130, the wet gel is dried to yield a dry gel. The drying step 130 allows the wet gel to be fixed to the concrete structure. Examples of the specific method for the drying step 130 include the blowing of hot air to the concrete structure (in particular, the applied portion), or the heating of the concrete structure.

In the wetting step 140, water is brought into contact with the dry gel. Owing to the wetting step 140, the dry gel is brought back to a wet gel having fluidity. The wet gel has fluidity, and hence has a self-repairing function such as filling the subsequently generated defects (such as cracks). After the completion of the filling of the defects, the drying step 150 may also be performed for the filled portions. The drying step 150 may adopt the same method as in the drying step 130.

Figure 5:
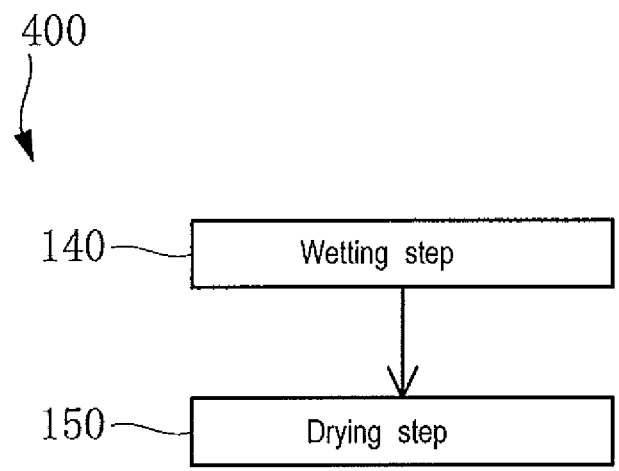
FIG. 5 is an illustrative diagram for illustrating the outline of a fourth method for repairing a concrete structure.

The method 200 for repairing a concrete structure (see FIG. 3) may also be performed at the positions in which no cracks are found at the moment, but cracks are likely to be formed in the future. In this way, the dry gel can be provided beforehand at the positions in which cracks are likely to be formed in the future. When the cracks are formed at the positions concerned, the self-repairing step 400 shown in FIG. 5 may also be performed. In the self-repairing step 400, the wetting step 140 and the drying step 150 are performed. The self-repairing step 400 also allows the cracks concerned to be repaired by using the beforehand provided dry gel. Needless to say, when only the self-repairing step 400 is insufficient for the repair of the cracks, the method 300 for repairing a concrete structure may also be performed, or alternatively, the method 300 for repairing a concrete structure may be performed in place of the self-repairing step 400.

In order to reduce the time required for the drying step 130, a preheating step of preheating the concrete portion undergoing application, the modifying agent for a concrete structure or the concrete protective agent may also be performed before the protective agent supply step 120.

The method in which the alkaline electrolyzed water including calcium ions dissolved therein is used as the modifying agent for a concrete structure in combination with the concrete protective agent is suitable also for the case where the cracks of the concrete structure are repaired.

The repair of the cracks of the concrete structure based only on the concrete protective agent has hitherto been performed; however, the widths of repairable cracks are approximately of the order of 0.2 mm. On the other hand, a large amount of calcium ions is included in the modifying agent for a concrete structure. Accordingly, by using the modifying agent for a concrete structure in combination with the concrete protective agent, the production of calcium silicate can be performed in a short time. Consequently, the repair based on the filling of calcium silicate is made easy for relatively large cracks of the order of 2 mm in width. Here, the supply timing of the concrete protective agent may be set at a time after the supplied modifying agent for a concrete structure completely penetrates into the concrete structure; however, from the viewpoint of the time efficiency, the supply timing of the concrete protective agent may also be set at the time of the occurrence of the state in which a part of the modifying agent for a concrete structure penetrates into the concrete structure, but the rest of the modifying agent remains in the cracks.

Examples of conventional methods for repairing cracks of a concrete structure include a method in which cracked portions are excavated and the excavated portions are filled with filling agents (such as mortar, epoxy resin and urethane). However, when mortar is filled, due to the difference in dry contraction rate between the concrete structure and the mortar, exfoliation occurs on the boundary between the concrete structure and the mortar. The portions undergoing the occurrence of exfoliation work as the penetration path for the degrading substance such as seawater, rainwater or carbon dioxide gas. Accordingly, in the case of the method for filling mortar, the durability of the concrete structure is degraded with time. In the case of the method for filling epoxy resin, the penetration of water may cause the adhesion failure of epoxy resin, and in the case of the method for filling urethane, the penetration of water causes the hydrolysis of urethane itself.

On the other hand, the modifying agent for a concrete structure of the present invention is free from the occurrence of such exfoliation due to the difference in dry contraction rate as in the mortar filling method. As described above, the modifying agent for a concrete structure is tough against the water penetrating from the outside as compared with the method for filling epoxy resin or urethane. Specifically, the wet gel blocks the penetration of water with respect to the penetration of water from the outside. Additionally, the dry gel is converted into the wet gel by the contact with the water concerned, and can block the subsequent penetration of water. As described above, the wet gel can also perform the self-repairing of subsequently caused defects (such as cracks).

The modifying agent for a concrete structure of the present invention allows the repairing operation to be simple, and additionally, allows very high durability to be imparted to the repaired concrete structure, as compared with conventional methods for repairing cracks of a concrete structure.

In the method for filling mortar, the combined use of the modifying agent for a concrete structure and the concrete protective agent in the boundary between the concrete structure and the mortar also allows the exfoliation in the boundary to be suppressed.

The alkaline electrolyzed water including calcium ions dissolved therein is applied, as the modifying agent for a concrete structure, to the concrete structure, and hence the following white turbidity phenomenon is suppressed: calcium-containing substances adhere to the surface of the concrete structure. Consequently, the exterior appearance of the concrete structure is not impaired. In addition, the alkaline electrolyzed water more easily penetrates into the concrete structure than common water. The high penetrability of the alkaline electrolyzed water is inferred to be due to the smaller ion radius of a hydroxide ion than the size of a water molecule. The calcium ions dissolved in the alkaline electrolyzed water more easily penetrate into a concrete structure than the calcium ions included in common calcium hydroxide aqueous solutions. Specifically, by supplying the alkaline electrolyzed water including calcium ions dissolved therein as the modifying agent for a concrete structure to the concrete, a large amount of calcium ions and a large amount of hydroxide ions can be supplied to the inside of the concrete structure as well as to the surface layer of the concrete structure.

Here, it is to be noted that the production of calcium silicate in the surface layer portion of the concrete structure dose not disturb the penetration of the modifying agent for a concrete structure or the concrete protective agent into the inside of the concrete structure, or the production of calcium silicate in the inside of the concrete structure. In other words, when calcium silicate is present in the surface layer portion, the concrete protective agent, applied to the concrete structure later than the modifying agent for a concrete structure, penetrates into the inside of the concrete structure. Consequently, in the inside of the concrete structure, the reaction between the earlier penetrating modifying agent for a concrete structure and the later penetrating concrete protective agent produces gel-like calcium silicate.

In this regard, it is inferred as follows. The modifying agent for a concrete structure, namely, the alkaline electrolyzed water including calcium ions dissolved therein is high in the affinity with the concrete protective agent. Accordingly, the concrete protective agent applied later to the concrete structure does not separate from the modifying agent for a concrete structure present in the inside of the concrete structure, with the calcium silicate produced in the surface layer portion serving as the border therebetween.

In the above described embodiment, for the purpose of repairing a concrete structure, the application of the modifying agent for a concrete structure and the application of the concrete protective agent are performed in this order to the concrete structure; however, this combination may be repeated a plurality of times.

Experiments 1 to 6 were performed by the following methods. The details of each of Experiments are described for Experiment 1, and for Experiments 2 to 6, the description of the same matters as in Experiment 1 and the like is omitted, and the matters different from the matters in Experiment 1 and the like are described.

Experiment 1

Hereinafter, the procedures of Experiment 1 are described.

(Preliminary Preparation)

A modifying agent for a concrete structure was prepared as follows. In 1000 ml of tap water (25° C.), 50 g of calcium lactate (Musashino Chemical Laboratory, Ltd.) was dissolved. As the tap water, the tap waters obtained at the water sampling site Nos. 5 to 7 of Table 1 were used. The water thus obtained was poured into a water tank 10 of the manufacturing equipment 2 for the modifying agent for a concrete structure shown in FIG. 1, and subjected to electrolysis; the alkaline electrolyzed water obtained by the electrolysis was adopted as the modifying agent for a concrete structure. On the basis of ICP atomic emission spectrophotometry (JIS K0101 No. 49), the amount of Ca ions in the modifying agent for a concrete structure was measured, and the amount of Ca ions in the modifying agent for a concrete structure was found to be $2.5 \times 10^5$ mg/L.

TABLE 1

Water quality test results
(Test results of standard items; test date: May, 2013)

No1 (1/3)

| | | Water sampling site No. | | | | | | | | | | |
|---|---|---|---|---|---|---|---|---|---|---|---|---|
| | | 1 | 2 | 3 | 4 | 5 | 6 | 7 | 8 | 9 | 10 | Reference value |
| Water sampling site | | Misaki Water Purification Plant | | | | (Kirihata) | (Jonan-machi) | (Iizuka-machi) | Minami Yamagata Water Distribution Plant (Kashiwakura) | | Miharashino-Oka Water Distribution Plant | |
| Water type | | Raw water | Coagulation sedimentation treated water | Biological activated carbon treated water | Purified water | Hydrant water | Hydrant water | Hydrant water | Distribution reservoir water | Hydrant water | Hydrant water | |
| Date and time of water sampling | | 13th day, 10:20 | 13th day, 10:30 | 13th day, 10:00 | 13th day, 10:40 | 13th day, 9:20 | 13th day, 9:05 | 13th day, 9:20 | 13th day, 10:20 | 13th day, 9:40 | 13th day, 10:05 | |
| Weather (previous day/sampling day) | | Fine/fine | Fine/fine | Fine/fine | Fine/fine | Fine/fine | Fine/fine | Fine/fine | Fine/fine | Fine/fine | Fine/fine | |
| Air temperature (° C.) | | 22.6 | 22.6 | 22.6 | 22.6 | 19.6 | 18.3 | 19.4 | 20.6 | 18.8 | 20.2 | |
| Water temperature (° C.) | | 11.4 | 12.8 | 11.6 | 11.2 | 11.5 | 11.7 | 12.0 | 6.8 | 11.9 | 14.8 | |
| 1 General bacteria | CFU/ml | | | | 0 | 0 | 0 | 0 | 0 | 0 | 0 | 100 or less |
| 2 $Escherichia\ coli$ | MPN/100 ml | | | | Not detected | Not detected | Not detected | Not detected | Not detected | Not detected | Not detected | No detection |
| 3 Cadmium and its compounds | mg/l | <0.0003 | | | <0.0003 | | | | | | | 0.003 or less |
| 4 Mercury and its compounds | mg/l | | | | | | | | | | | 0.0005 or less |
| 5 Selenium and its compounds | mg/l | <0.001 | | | <0.001 | | | | | | | 0.01 or less |
| 6 Lead and its compounds | mg/l | <0.001 | | | <0.001 | | | | | | | 0.01 or less |
| 7 Arsenic and its compounds | mg/l | <0.001 | | | <0.001 | | | | | | | 0.01 or less |
| 8 Hexavalent chromium and its compounds | mg/l | <0.001 | | | <0.001 | | | | | | | 0.05 or less |
| 9 Cyanide ion and cyan chloride | mg/l | | | | | | | | | | | 0.01 or Less |
| 10 Nitrate nitrogen and nitrite nitrogen | mg/l | | | | | 0.35 | 0.34 | 0.32 | | 0.21 | 0.22 | 10 or less |
| 11 Fluorine and its compounds | mg/l | | | | | | | | | | | 0.8 or less |
| 12 Boron and its compounds | mg/l | | | | | | | | | | | 1.0 or less |
| 13 Carbon tetrachloride | mg/l | | | | | | | | | | | 0.002 or less |
| 14 1,4-Dioxane | mg/l | <0.01 | | | <0.01 | | | | | | | 0.05 or less |
| 15 cis-1,2-Dichloroethylene and trans-1,2-dichloroethylene | mg/l | | | | | | | | | | | 0.04 or less |
| 16 Dichloromethane | mg/l | | | | | | | | | | | 0.02 or less |
| 17 Tetrachloroethylene | mg/l | | | | | | | | | | | 0.01 or less |
| 18 Trichloroethylene | mg/l | | | | | | | | | | | 0.01 or less |
| 19 Benzene | mg/l | | | | | | | | | | | 0.01 or less |
| 20 Chloric acid | mg/l | | | | | <0.06 | <0.06 | <0.06 | | <0.06 | <0.06 | 0.6 or less |
| 21 Chloroacetic acid | mg/l | | | | | | | | | | | 0.02 or less |
| 22 Chloroform | mg/l | | | | | | | | | | | 0.06 or less |
| 23 Dichloroacetic acid | mg/l | | | | | | | | | | | 0.04 or less |
| 24 Dibromochloromethane | mg/l | | | | | | | | | | | 0.1 or less |
| 25 Bromic acid | mg/l | | | | | <0.001 | <0.001 | <0.001 | | <0.001 | <0.001 | 0.01 or less |
| 26 Total trihalomethane | mg/l | | | | | | | | | | | 0.1 or less |

TABLE 1-continued

Water quality test results
(Test results of standard items; test date: May, 2013)

No1 (1/3)

| | | | Water sampling site No. | | | | | | | | | | Reference value |
|---|---|---|---|---|---|---|---|---|---|---|---|---|---|
| | | | 1 | 2 | 3 | 4 | 5 | 6 | 7 | 8 | 9 | 10 | |
| 27 | Trichloroacetic acid | mg/l | | | | | | | | | | | 0.2 or less |
| 28 | Bromodichloromethane | mg/l | | | | | | | | | | | 0.03 or less |
| 29 | Bromoform | mg/l | | | | | | | | | | | 0.09 or less |
| 30 | Formaldehyde | mg/l | | | | | | | | | | | 0.08 or less |
| 31 | Zinc and its compounds | mg/l | <0.01 | | | <0.01 | | | | | | | 1.0 or less |
| 32 | Aluminum and its compounds | mg/l | 0.27 | 0.05 | | 0.03 | | | | | | | 0.2 or less |
| 33 | Iron and its compounds | mg/l | 0.44 | <0.01 | | <0.01 | | | | | | | 0.3 or less |
| 34 | Copper and its compounds | mg/l | <0.01 | | | <0.01 | | | | | | | 1.0 or less |
| 35 | Sodium and its compounds | mg/l | | | | | 9.2 | 8.9 | 8.4 | | 6.1 | 6.2 | 200 or less |
| 36 | Manganese and its compounds | mg/l | 0.027 | 0.008 | | <0.001 | | | | | | | 0.05 or less |
| 37 | Chloride ion | mg/l | | | | | 11 | 11 | 10 | | 9 | 9 | 200 or less |
| 38 | Calcium, magnesium and the like (hardness) | mg/l | | | | | 16 | 16 | 16 | | 14 | 14 | 300 or less |
| 39 | Evaporation residue | mg/l | | | | | | | | | | | 500 or less |
| 40 | Anionic surfactants | mg/l | | | | | | | | | | | 0.2 or less |
| 41 | Geosmin | mg/l | 0.000002 | | | <0.000001 | <0.000001 | <0.000001 | <0.000001 | 0.000001 | 0.000001 | <0.000001 | 0.00001 or less |
| 42 | 2-Methylisoborneol | mg/l | <0.000001 | | | <0.000001 | <0.000001 | <0.000001 | <0.000001 | <0.000001 | <0.000001 | <0.000001 | 0.00001 or less |
| 43 | Nonionic surfactants | mg/l | | | | | | | | | | | 0.02 or less |
| 44 | Phenols | mg/l | | | | | | | | | | | 0.005 or less |
| 45 | Organic matter (content of total organic carbon (TOC)) | mg/l | 1.5 | 0.5 | 0.2 | 0.3 | 0.2 | 0.3 | 0.2 | 0.3 | 0.3 | 0.3 | 3 or less |
| 46 | pH value | — | 6.6 | 6.8 | 7.0 | 7.3 | 7.4 | 7.4 | 7.5 | 7.5 | 7.5 | 7.5 | 5.8 or more and 8.6 or less |
| 47 | Taste | — | | | | No abnormality | No abnormality | No abnormality | No abnormality | No abnormality | No abnormality | No abnormality | Not abnormal |
| 48 | Odor | — | Musty odor | | Odorless | No abnormality | No abnormality | No abnormality | No abnormality | No abnormality | No abnormality | No abnormality | Not abnormal |
| 49 | Chromaticity | degrees | 4.3 | 0.6 | <0.5 | <0.5 | <0.5 | <0.5 | <0.5 | <0.5 | <0.5 | <0.5 | 5 degrees or less |
| 50 | Turbidity | degrees | 10 | 0.1 | <0.1 | <0.1 | <0.1 | <0.1 | <0.1 | <0.1 | <0.1 | <0.1 | 2 degrees or less |
| | Residual chlorine | mg/l | | | | 0.42 | 0.36 | 0.40 | 0.40 | 0.58 | 0.56 | 0.52 | |
| | Judgment | | ○ | ○ | ○ | ○ | ○ | ○ | ○ | ○ | ○ | ○ | ○: Pass |
| | Test period | | May 13 to 27, 2013 | | | | | | Remarks: | | | | |
| | Name of Water quality testing institute | | Yamagata City Water and Sewer Services Department/Water Supply Operation Center (27 Minami-Ishizeki, Yamagata City) | | | | | | | | | | |

As the concrete protective agent, Super Shield (registered trademark) manufactured by Super Shield Corp. was used.

A calcium aqueous solution was prepared by dissolving 1.7 g of calcium hydroxide (special grade hydrated lime, manufactured by Marukyo Sekkai, K.K.) in 1000 ml of tap water (25° C.). On the basis of ICP atomic emission spectrophotometry (JIS K0101 No. 49), the amount of Ca ions in the calcium aqueous solution was measured, and the amount of Ca ions in the modifying agent for a concrete structure was found to be 8.1 mg/L.

As sprinkling water, Ca ion-containing water was used. On the basis of ICP atomic emission spectrophotometry (JIS K0101 No. 49), the amount of Ca ions in the sprinkling water was found to be 6.4 mg/L.

Figure 6:
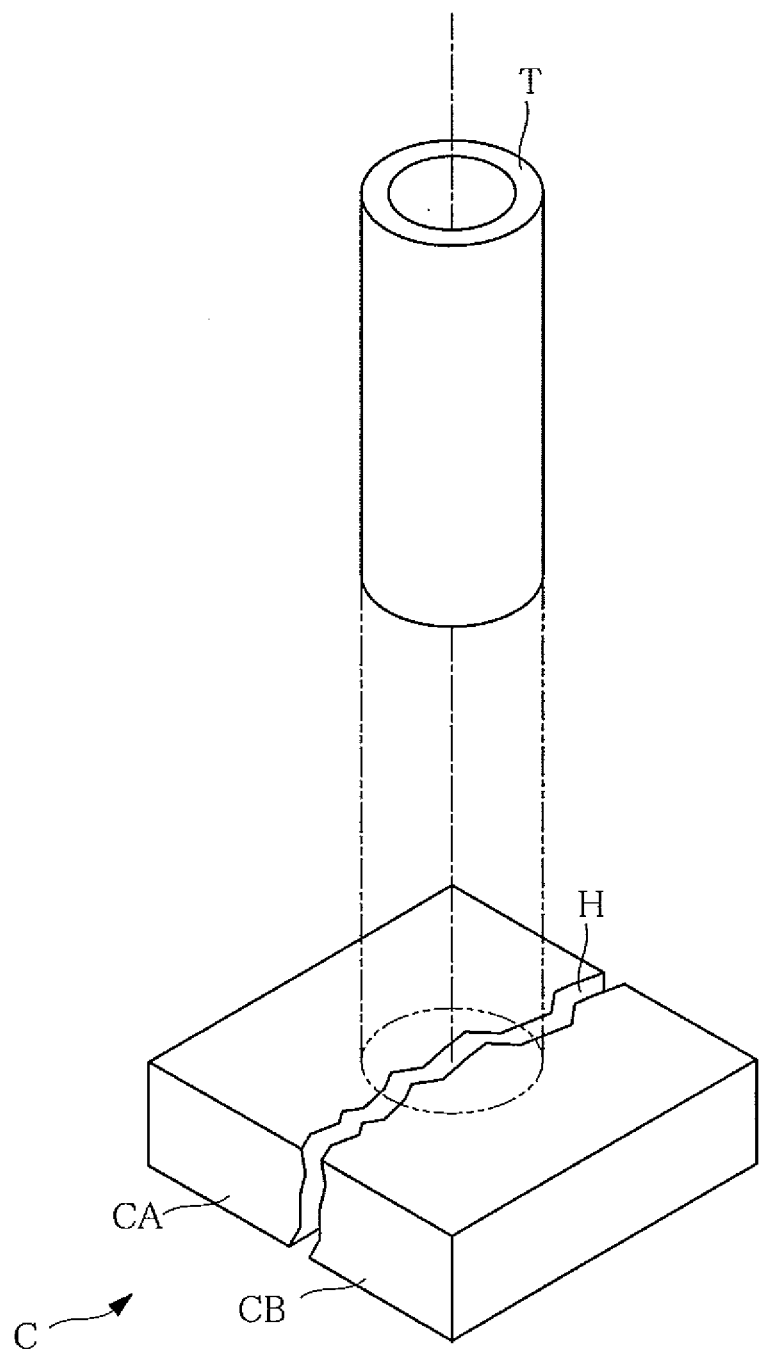
FIG. 6 is an oblique perspective view for illustrating the outline of a concrete plate and a measuring pipe used in Examples.

A concrete plate C (300-mm square, thickness: 35 mm) was divided into two pieces (specimen CA and specimen CB) by applying a load to the concrete plate. Here, it is to be noted that the concrete plate was formed from concrete of mortar having a 1:3 composition. As shown in FIG. 6, the specimens CA, CB were arranged so as for the cross sections of the specimens CA, CB to face each other, and thus a crack H (width: 2 mm) composed of the cross sections of the specimens CA, CB was formed simulatively.

Figure 7:
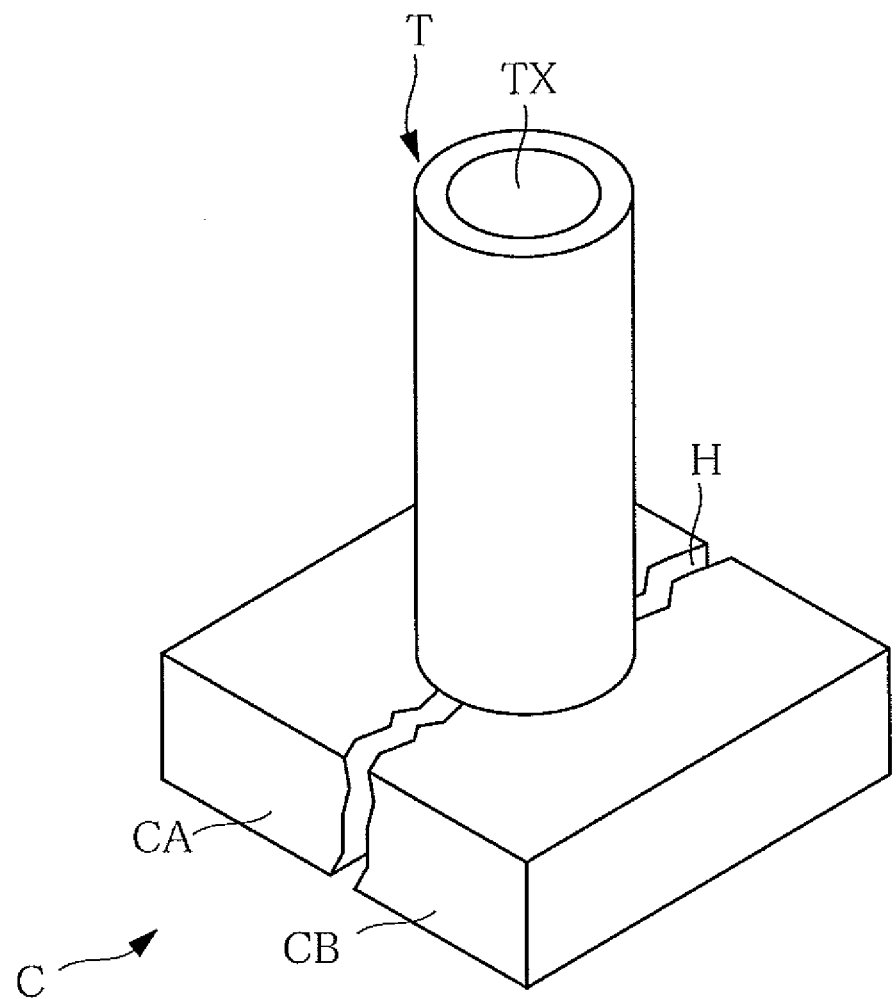
FIG. 7 is an oblique perspective view for illustrating the outline of a concrete plate and a measuring pipe used in Examples.

Next, a measuring tube T (diameter: 70 mm) was stood on the concrete plate C so as for the center of the measuring tube T (diameter: 70 mm) to be superposed on the center of the crack H, and was fixed with a sealant (see FIG. 7). Subsequently, the modifying agent for a concrete structure was applied to the surface of the concrete plate C exposed from the inside of the measuring tube T. The amount of the modifying agent for a concrete structure applied was 250 ml per $m^2$. Then, to the surface of the concrete plate C on which the modifying agent for a concrete structure was applied, a concrete protective agent (trade name: Super Shield, manufactured by Super Shield Corp.) was applied. The amount of the concrete protective agent applied was 250 ml per $m^2$. After the application of the concrete protective agent, the specimens and the measuring tube were allowed to stand for 24 hours.

As a test water, a tap water (400 ml) of Table 1 was poured into the internal space TX of the measuring tube T, and the amount of the test water leaking from the lower surface of the concrete plate C, namely, from the simulatively formed crack H, and the time at which the leakage of the test water ceased were measured. Immediately before the test water poured into the measuring tube T disappeared, 400 ml of the test water was additionally poured into the inside of the measuring tube T.

Experiment 2

The calcium aqueous solution was applied to the surface of the concrete plate C exposed from the inside of the measuring tube T. Subsequently, Experiment 2 was performed in the same manner as in Experiment 1 except that the concrete protective agent was applied to the surface of the concrete plate C to which the calcium aqueous solution was applied. The amount of each of the concrete protective agent and the calcium aqueous solution applied was 250 ml per $m^2$.

Experiment 3

Experiment 3 was performed in the same manner as in Experiment 1 except that the concrete protective agent was applied to the surface of the concrete plate C exposed from the inside of the measuring tube T, and the sprinkling water was applied to the surface of the concrete plate C to which the concrete protective agent was applied. The amount of each of the concrete protective agent and the sprinkling water applied was 250 ml per $m^2$. The amount of each of the concrete protective agent and the sprinkling water applied was 250 ml per $m^2$.

The experimental results of Experiments 1 to 3 are as shown in Table 2.

TABLE 2

| Sample state | | Experiment 1 Concrete protective agent Concrete modifying agent Concrete plate | | Experiment 2 Concrete protective agent Calcium aqueous solution Concrete plate | | Experiment 3 Sprinkling water Concrete protective agent Concrete plate | |
|---|---|---|---|---|---|---|---|
| Amount of water poured | Immediately after start of experiment | — | 400 ml | — | 400 ml | — | 400 ml |
| | First additional pouring | — | — | 2 hours after start of experiment | 400 ml | 10 minutes after start of experiment | 400 ml |
| | Second additional pouring | — | — | 15 hours after start of experiment | 400 ml | 30 minutes after start of experiment | 400 ml |
| | Third additional pouring | — | — | 30 hours after start of experiment | 400 ml | 60 minutes after start of experiment | 400 ml |
| | Fourth additional pouring | — | — | — | — | — | — |
| Amount of water leaked | | | 100 ml | | 1400 ml | | 1600 ml |
| Amount of water remaining in measuring tube | | | 300 ml | | 200 ml | | 0 ml |
| Water leakage cessation time | | | 1 hour after start of experiment | | 38 hours after start of experiment | | Experiment was ended at 60 minutes after the start of the experiment, but the water leakage did not cease. |

Experiment 4

After Experiment 1, the concrete plate C was hit with a test hammer to regenerate a 2-mm-wide crack. Subsequently, in the same manner as in Experiment 1, 400 ml of the test water was poured into the internal space TX of the measuring tube T, and the amount of the test water leaking from the simulatively formed crack was measured.

Experiment 5

After Experiment 2, the concrete plate C was hit with a test hammer to regenerate a 2-mm-wide crack. Subsequently, in the same manner as in Experiment 4, 400 ml of the test water was poured into the internal space TX of the measuring tube T, and the amount of the test water leaking from the simulatively formed crack was measured.

Experiment 6

After Experiment 3, the concrete plate was hit with a test hammer to regenerate a 2-mm-wide crack. Subsequently, in the same manner as in Experiment 4, 400 ml of the test water was poured into the internal space TX of the measuring tube T, and the amount of the test water leaking from the simulatively formed crack was measured.

The experimental results of Experiments 4 to 6 are as shown in Table 3.

TABLE 3

| Sample state | | Experiment 4<br>Concrete protective agent<br>Concrete modifying agent<br>Concrete plate | | Experiment 5<br>Concrete protective agent<br>Calcium aqueous solution<br>Concrete plate | | Experiment 6<br>Sprinkling water<br>Concrete protective agent<br>Concrete plate | |
|---|---|---|---|---|---|---|---|
| Amount of water poured | Immediately after start of experiment | — | 400 ml | — | 400 ml | — | 400 ml |
| | First additional pouring | 27 hours after start of experiment | 400 ml | 1 hour after start of experiment | 400 ml | 3 hours after start of experiment | 400 ml |
| | Second additional pouring | — | — | 8 hours after start of experiment | 400 ml | 8 hours after start of experiment | 400 ml |
| | Third additional pouring | — | — | 15 hours after start of experiment | 400 ml | 14 hours after start of experiment | 400 ml |
| | Fourth additional pouring | — | — | 25 hours after start of experiment | 400 ml | 23 hours after start of experiment | 400 ml |
| | Fifth additional pouring | — | — | 40 hours after start of experiment | 400 ml | 35 hours after start of experiment | 400 ml |
| | Sixth additional pouring | — | — | 60 hours after start of experiment | 400 ml | 48 hours after start of experiment | 400 ml |
| Amount of water leaked | | 600 ml | | 2600 ml | | 2800 ml | |
| Amount of water remaining in measuring tube | | 200 ml | | 200 ml | | 2800 ml | |
| Water leakage cessation time | | 48 hours after start of experiment | | 72 hours after start of experiment | | Experiment was ended at 48 hours after the start of the experiment, but the water leakage did not cease. | |

As described above, by the application of the modifying agent for a concrete structure of the present invention, an absolutely excellent blocking effect is obtained against a crack having relatively large width. In the case where the modifying agent for a concrete structure of the present invention is applied, even when cracks are regenerated after the application, an absolutely excellent self-repairing effect can be obtained. The blocking effect and the self-repairing effect due to the application of the modifying agent for a concrete structure of the present invention are absolutely excellent as compared with the blocking effect and the self-repairing effect due to the application of common calcium aqueous solutions.

The present invention should not be limited to the foregoing embodiments and, needless to say, may be modified in various ways within a scope not departing from the gist of the present invention.

The invention claimed is:

1. A modifying agent for a concrete structure comprising an alkaline electrolyzed water;
   wherein when a substance being supplied to a concrete structure in order to produce calcium silicate for repairing concrete and including an alkali metal silicate is defined as a concrete protective agent;
   the modifying agent is supplied to the concrete structure in advance of a supply of the concrete protective agent; and
   the alkali metal silicate and a calcium ion included in the concrete protective agent contribute to the production of the calcium silicate.

2. The modifying agent for a concrete structure according to claim 1, wherein the modifying agent is supplied to the concrete structure in order to repair a crack of the concrete structure.

3. A method for repairing a concrete structure, comprising,
   when a substance being supplied to a concrete structure in order to produce calcium silicate for repairing the concrete structure and including an alkali metal silicate is defined as a concrete protective agent:
   a protective agent supply step of supplying the concrete protective agent to the concrete structure; and
   a modifying agent supply step of supplying a modifying agent for a concrete structure comprising an alkaline electrolyzed water to the concrete structure, the modifying agent supply step being performed before the protective agent supply step in order to promote the production of the calcium silicate in the protective agent supply step.

4. The method for repairing a concrete structure according to claim 3, wherein in the protective agent supply step, the concrete protective agent is supplied to the concrete structure in a state of being penetrated by the alkaline electrolyzed water.

5. The method for repairing a concrete structure according to claim 3, wherein the method further comprises a drying step of drying the calcium silicate performed after the protective agent supply step.

6. The method for repairing a concrete structure according to claim 5, wherein the method further comprises a wetting step of supplying water to the calcium silicate in a dry state.

* * * * *